United States Patent [19]

Smith

[11] Patent Number: 4,671,208

[45] Date of Patent: Jun. 9, 1987

[54] CLAY AND LIMESTONE COMPOSITION

[75] Inventor: George N. Smith, Orlando, Fla.

[73] Assignee: International Packaging, Inc., Casselberry, Fla.

[21] Appl. No.: 679,464

[22] Filed: Dec. 7, 1984

[51] Int. Cl.$^4$ ............................................. A01K 1/015
[52] U.S. Cl. ....................................................... 119/1
[58] Field of Search ............................................ 119/1

[56] References Cited

U.S. PATENT DOCUMENTS

| | | | |
|---|---|---|---|
| 2,597,457 | 5/1952 | Cook | 119/1 |
| 3,921,581 | 11/1975 | Brewer | 119/1 |
| 4,108,669 | 8/1978 | Otrahalek et al. | 106/13 |
| 4,243,415 | 1/1981 | Lowe, Jr. | 106/13 |
| 4,430,242 | 2/1984 | Gancy | 252/70 |

FOREIGN PATENT DOCUMENTS

| | | | |
|---|---|---|---|
| 3141644 | 5/1983 | Fed. Rep. of Germany | 252/70 |
| 3148417 | 7/1983 | Fed. Rep. of Germany | 252/70 |
| 111532 | 8/1979 | Japan | 106/13 |
| 219399 | 12/1983 | Japan | 252/70 |
| 993979 | 6/1965 | United Kingdom | 502/80 |

OTHER PUBLICATIONS

Information Disclosure Statement, filed Mar. 11, 1985.

*Primary Examiner*—Robert P. Swiatek
*Assistant Examiner*—Hugh R. Chamblee
*Attorney, Agent, or Firm*—Willian Brinks Olds Hofer Gilson & Lione, Ltd.

[57] ABSTRACT

A composition of ground clay and crushed limestone is disclosed. The composition is particularly useful as a cat litter.

8 Claims, No Drawings

CLAY AND LIMESTONE COMPOSITION

BACKGROUND OF THE INVENTION

This invention relates to compositions comprising clay and limestone, and more particularly to a composition of clay and limestone useful as a cat litter.

Previously it has been known to use sand in a container as a cat litter box, used by people who keep cats as housepets. More recently, ground dried clay has also been used as a cat litter. The cat litter provides a place for a cat to scratch and deposit urine and feces. The purpose of the cat litter, in the case of sand, is simply to hide the deposits until the urine evaporates or the cat litter is disposed of. The use of clay is often preferred because the clay also absorbs the cat urine. Other additives, such as fragrances, coloring, etc., have been used to make the cat litter more appealing to consumers.

One problem with clay cat litter is its cost. Clay is often mined by relatively expensive strip-mining techniques. Also, after being mined, clay must be heated to remove unwanted moisture. In light of current energy costs, this treatment adds significantly to the cost of the clay. Additionally, in areas distant from clay deposits, the cost of transporting heavy, bulky clay also adds to the ultimate cost of the product. Another disadvantage with both sand and clay cat litter is that neither have a naturally occurring ability to neutralize acid in cat urine.

SUMMARY OF THE INVENTION

According to the present invention, crushed limestone is added to ground clay to make a composition particularly useful as a cat litter. The addition of limestone produces several benefits.

First, limestone is usually mined using open pit methods, generally less expensive than clay mining methods. In addition, limestone does not absorb water as does clay, so that even when drying is required, the large expense involved in drying clay is not encountered. (When mixed with clay in the present invention, any moisture left adsorbed on the surface of the limestone is quickly absorbed by the clay, resulting in a dry product. Thus, removing all the water from crushed limestone before it is used in the present invention is not necessary.) Also, in those areas close to limestone deposits and removed from clay deposits, the cost of transporting the crushed limestone is less than the cost of transporting ground clay. These three factors result in a reduced cost for the composition of the present invention because the crushed limestone is less expensive than the clay it replaces in a cat litter composition comprised almost entirely of clay.

Second, limestone is naturally basic and neutralizes the acid in cat urine. This helps in reducing odors emanating from a cat litter box.

It has also been known to use cat litter to provide traction on snow and ice. The composition of the present invention is better for this purpose than conventional clay cat litter because of the hardness of the crushed limestone.

It has also been known to put cat litter in soil as an aid in improving soil conditions for growing plants. Inasmuch as limestone itself is often used to treat acidic soil conditions, the composition of the present invention is an improvement over conventional cat litter when used to condition acidic soil.

DETAILED DESCRIPTION OF THE INVENTION AND OF THE PREFERRED EMBODIMENT

As used herein, the term cat refers to cats, kittens and the like, and the term cat litter refers to a composition used by house pets for depositing urine and feces.

Ground clay is a generic term which describes numerous types of clays that are processed and have common absorbent properties. These clays include, but are not limited to, Montmorillonite, Attapulgite, Bentonite, Porter's Creek clay and Fullers Earth. Each type of clay has a slightly different compositions. Also, clay composition will vary between and within deposits of the same type. Any absorbent ground clay can be used in the composition of the present invention.

Clay is generally processed by mining, drying, crushing and particle sizing. An additional step of heat treating may be used to further dry and harden the clay. As used herein, ground dried clay refers to clay which has been subjected to normal dying conditions, usually not more than 300°-700° F. The term heat treated clay as used herein refers to ground clay which has been subjected to higher temperatures, in the range of 800°-1400° F., for the purpose of hardening the clay. Either ground dried clay or heat treated clay may be used in the present invention, though ground dried clay is preferred because it is less expensive and the increased hardness produced by heat treating is unnecessary when the composition is used as a cat litter.

Limestone and dolomite are common minerals naturally occurring together, though in varying relative concentrations. Limestone is primarily calcium carbonate (CaCO) and dolomite is primarily calcium magnesium carbonate $(CaMg(CO_3)_2)$. When large amounts of both minerals occur naturally mixed together, the material may be referred to as dolomitic limestone.

Processing of these minerals include mining, crushing and sizing. Some applications require the aggregate to be dried. The chemical composition of these minerals neutralizes acid. The minerals in a crushed state adsorb liquids on their surface, but that adsorption is much less than the absorption of liquid by clay particles. As used herein, the term crushed limestone refers to limestone, dolomitic limestone or dolomite in a processed state.

The composition of the present invention comprises a mixture of ground clay and crushed limestone. The manner of producing and sizing the components of the mixture is well known in the art, as is the method of producing a mixture of two or more dry, particulate components.

A preferred embodiment of the present invention comprises a mixture of ground dried clay and crushed limestone. In the preferred embodiment an Attapulgite clay of the following composition has been used:

| Chemical Analysis (Volatile-Free Basis) | |
|---|---|
| $SiO_2$ | 68.0% |
| $Al_2O_3$ | 12.0% |
| MgO | 10.5% |
| $Fe_2O_3$ | 5.0% |
| CaO | 1.7% |
| $P_2O_5$ | 1.9% |
| $K_2O$ | 1.0% |
| $TiO_2$ | 0.7% |
| Trace Elements | 0.1% |

The clay particle size used in the preferred embodiment is 8/45 mesh, meaning particles of a size that will pass through a Number 8 Sieve but not through a Number 45 Sieve (U.S. Sieve Numbers). The crushed limestone used in the preferred embodiment is dolomitic limestone comprised of 53% limestone and 47% dolomite, sized to a 16/25 mesh.

The percentage of clay and limestone used in the composition can be varied to take advantage of the lower cost of the limestone, trading off the absorbency provided by the clay. In most instances, however, a consumer will not use the full absorption capacity of the amount of cat litter normally placed in a cat litter box. Therefore a high percentage of clay is not necessary for producing a suitable product.

The composition of the present invention could be any mixture range, but a composition ranging from 40% clay-60% limestone to 90% clay-10% limestone is most useful. The preferred embodiment includes mixtures ranging from 60% clay-40% limestone to 80% clay-20% limestone. The higher percentage clay mixtures are more absorbent but are also more expensive than the lower percentage clay mixtures. The higher percentage clay mixtures still possess sufficient limestone to improve the quality of the cat litter, especially in the aspect of acid neutralization. A medium quality grade of cat litter can be made using 70% clay-30% limestone. Various other mixtures may be used as different grades of cat litter.

Another embodiment of the invention uses Montmorillonite instead of Attapulgite clay. This embodiment uses the same range of clay and limestone mixtures and particle sizes as the preferred embodiment. The composition of this embodiment yields a lower grade of cat litter than the compositions formed using Attapulgite clay because Montmorillonite is less absorbent than Attapulgite clay. Montmorillonite is less expensive, however, than Attapulgite clay.

The size of particles of the composition is important because smaller particles tend to create more dust and are more easily tracked out of a cat litter box on a cat's paws. However, larger particle sizes are not as absorbent as smaller sizes because of the resultant reduction in the surface area/volume ratio. Also, it has been found that a variation in particle sizes within the composition is important as it provides absorbent small particles but also larger particles which can help distribute the liquid by capillary action.

Therefore, when used for a cat litter, the composition of the present invention should have a clay particle size of 4/45 mesh, and more preferably a size of 8/45 mesh. The crushed limestone particle size could be 8/45 mesh, but the most preferred size is 16/25 mesh.

One advantage of the present invention may be illustrated by noting typical costs. In the Chicago, Illinois area ground dried Attapulgite clay cost approximately ton plus $40/ton freight from Georgia, but crushed limestone only costs approximately $14/ton. Replacing 30% of the clay with limestone reduces the cost of raw materials in a cat litter approximately 25%, from about $92/ton to about $69/ton. As another comparison, even the less expensive Montmorillonite is ton, plus $30/ton for freight.

Another advantage is that, when used as a cat litter, the composition of the present invention naturally provides for neutralization of acid in cat urine. As a part of that advantage, the odor emanating from a cat litter box containing cat litter of the present invention is reduced. This reduction in odor is caused by the acid dissolving the limestone, increasing the pH of the liquid and thus reducing volatile organic acid odors.

If the composition of the present invention is used to provide traction on snow or ice, the presence of limestone in a hard aggregate form increases the traction provided by the composition as compared to a composition comprised only of ground clay. If the composition of the present invention is used as a soil conditioner, the presence of the limestone provides an aid in neutralizing acidic soil.

Other components can be added to the composition without departing from the invention. For example, fragrance or coloring could be added in making a cat litter from the composition of the present invention. Aggregate other than limestone could be used in the present invention, either replacing or along with the limestone, particularly where the aggregate has both the cost reduction and acid neutralization characteristics of crushed limestone.

These and other modification will be apparent to those skilled in the art. The present invention has been described in detail for purposes of illustration, and is not limited thereby but is defined in the following claims, including all equivalents.

I claim:

1. The use as a cat litter of a composition comprising 40–90% ground dried clay which has been dried to a temperature not in excess of about 700° F. and 10–60% crushed limestone.

2. The use as a cat litter of a composition as in claim 1 wherein the ground dried clay comprises 60–80% of the composition and the crushed limestone comprises 20–40% of the composition.

3. The use as a cat litter of a composition as in claim 1 wherein the crushed limestone is crushed dolomitic limestone.

4. The use as a cat litter of a composition as in claim 1 wherein the ground dried clay has a particle size of 8/45 mesh and the crushed limestone has a particle size of 16/25 mesh.

5. The use as a cat litter of a composition as in claim 4 wherein the crushed limestone is dolomitic limestone.

6. The use as a cat litter of a composition as in claim 1 further comprising a fragrance.

7. The use as a cat litter of a composition as in claim 1 wherein the ground dried clay is Attapulgite clay.

8. The use as a cat litter of a composition as in claim 1 wherein the ground dried clay in Montmorillonite clay.

* * * * *

UNITED STATES PATENT AND TRADEMARK OFFICE
CERTIFICATE OF CORRECTION

PATENT NO. : 4,671,208

DATED : June 9, 1987

INVENTOR(S) : George N. Smith

It is certified that error appears in the above-identified patent and that said Letters Patent is hereby corrected as shown below:

IN THE DETAILED DESCRIPTION
OF THE INVENTION AND OF THE
PREFERRED EMBODIMENT

In column 3, line 57, please delete "ton" (first occurrence) and substitute therefor --$52/ton--;

In column 4, line 2, please delete "ton" (first occurrence) and substitute therefor --$40/ton--.

Signed and Sealed this

Twenty-sixth Day of April, 1988

Attest:

DONALD J. QUIGG

*Attesting Officer*  *Commissioner of Patents and Trademarks*